Dec. 14, 1971     D. C. ARBON     3,626,759
THERMOSTATIC ELEMENTS
Filed Aug. 11, 1969
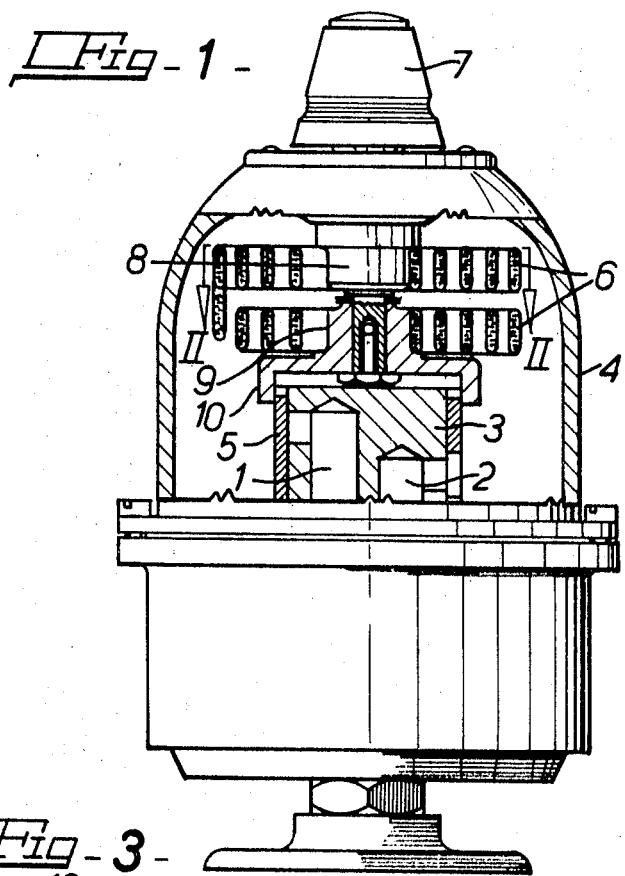
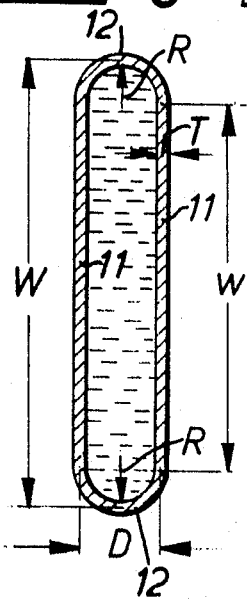
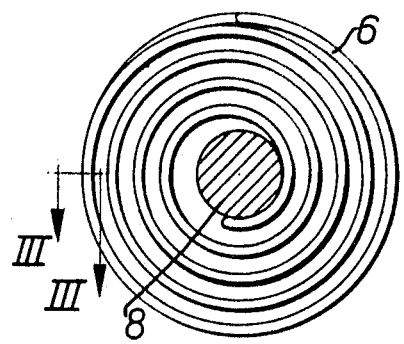
INVENTOR
DENNIS C. ARBON

United States Patent Office 3,626,759
Patented Dec. 14, 1971

3,626,759
THERMOSTATIC ELEMENTS
Dennis C. Arbon, 179 Leckhampton Road,
Cheltenham, England
Filed Aug. 11, 1969, Ser. No. 848,784
Int. Cl. G01k 5/38
U.S. Cl. 73—368.6                                       1 Claim

ABSTRACT OF THE DISCLOSURE

A thermally sensitive element comprising a sealed, spiral, metal tube which is filled with a non-toxic liquid under pressure and which, in cross section, is formed with an opposed pair of narrower, curved walls having concave internal surfaces, and with an opposed pair of wider walls having flat and parallel portions, the said walls are of the same uniform thickness, the internal radius of the narrower walls is not less than twice and not more than five times the wall thickness, the width of the parallel portions of the wider walls is not less than the mean thickness of the tube, and the mean width of the tube is not less than twice the said mean thickness. The element is produced by a method which comprises fabricating the tube in a straight, open-ended form, filling the tube with a solid supporting medium having a low melting point, shaping the straight tube to the spiral form, melting and expelling the supporting medium, sealing one end of and evacuating the tube, forcing the non-toxic liquid under pressure into the tube through the opposite end, and sealing the said opposite end.

---

This invention relates to thermally sensitive elements for use in controlling the operation of thermostatic valves of the kind adapted to mix two fluid streams having different temperatures (for example, hot and cold water), in preselected relative and variable proportions so as to provide a mixture of any desired temperature between the temperature of the hotter stream and the temperature of the colder stream.

The principal object of the present invention is to provide such a thermally sensitive element which is resistant to corrosion, has a long, useful life, and, to enable the mixture temperature to be controlled accurately in a valve of the above-mentioned kind, is adapted to impart a wide range of movement to a movable member which determines the relative proportions of the constituents in the mixture.

A further object of the invention is to provide a simple and economical method of manufacturing the element.

In accordance with one aspect of the said invention, a thermally sensitive element comprises a resilient, sealed and spiral metal tube, which is filled completely with liquid, has a wall of uniform thickness and a cross-section which is of uniform dimensions and is formed by two opposed, convexly curved, wall portions and two opposed and parallel wall portions, the radii of the internal surfaces of the convexly curved wall portions being equal to one another and not less than twice but not more than five times the said wall thickness, the mean thickness of the tube being equal to the sum of the said wall thickness and twice the radius of the said internal surfaces, the widths of the flat and parallel portions being equal to one another and not less than the said mean thickness, and the mean width of the tube being not less than twice the said mean thickness.

It is to be understood that the terms "mean width" and "mean thickness" used herein, are, respectively, dimensions measured between points located midway between the internal and external surfaces of the two convexly curved wall portions and of the two flat and parallel wall portions of the tube.

Preferably the tube is fabricated from a non-corrodible metal, such as a beryllium-copper alloy or Phosphor bronze, and is filled with and pre-stressed by a non-toxic liquid, such as distilled water, under pressure.

Desirably the wall of the tube is of such a uniform thickness that, when the element is heated to a predetermined maximum temperature and the liquid is expanded, the resulting increase in internal pressure does not deflect the tube beyond the elastic limit of the metal from which it is fabricated nor change the cross-sectional configuration of the tube beyond acceptable limits.

In accordance with a further aspect of the invention, the element is manufactured by a process which comprises filling the tube whilst its ends are open and before it is shaped to its spiral formation, with a non-toxic supporting medium, such as paraffin wax, having a low melting point, shaping the tube to the said spiral formation, melting and expelling the supporting medium, sealing one end of and then evacuating the tube, feeding the liquid under pressure through the opposite end until the tube is filled with and pre-stressed by the liquid, and sealing said opposite end.

If desired, the open-ended tube may be subjected, again before it is shaped to its spiral formation, to an annealing heat treatment and, after it has been so shaped but before it is evacuated, to a stress-relieving or precipitation hardening heating and quenching treatment.

In order that the invention may be understood and carried into practice more readily, one typical embodiment will now be described with reference to the accompanying drawing wherein:

FIG. 1 is a part-sectional elevation of a valve for mixing streams of hot and cold water, FIG. 2 is a diagrammatic section along the line II—II, FIG. 1, and FIG. 3 is a section, on an enlarged scale, along the line III—III, FIG. 2.

The valve shown in FIG. 1 is a typical example of many different valves of known construction each being of the kind adapted to mix two streams of hot and cold water to provide a stream of mixture having any preselected temperature between the temperatures of the hot and cold streams. In the valve shown in FIG. 1 the streams of hot and cold water are fed respectively from longitudinal passages 1 and 2 in a pillar 3, to the interior of a cover 4 in relative proportions determined by the setting of a ported sleeve 5 encircling the pillar and rotatable by a thermally sensitive element 6 either when the element is turned by a manually adjustable knob 7 to preselect the relative proportions of the constituents in and the temperature of the mixture, or when the element is deflected due to the mixture temperature departing from the preselected value.

Heretofore, it has been proposed to construct the thermally sensitive element from a single bimetal strip which, midway between its ends, is stepped to provide substantially equal offset portions which are formed into two superimposed, parallel and constant pitch, spiral coils of which the innermost convolutions encircle and are anchored, respectively, to a spindle 8 journalled in the cover and rotatable by the knob 7, and to a concentric hub 9 of a cap 10 coupled to the sleeve 5.

However, when the invention is applied to a twin-coil thermally-sensitive element for use in a valve such as shown in FIG. 1, instead of constructing the element from a stepped, bimetal strip, it is constructed from a stepped, resilient and sealed metal tube which is filled with and pre-stressed by distilled water under pressure.

As fabricated initially, the tube is straight and is of such uniform cross-sectional shape and dimensions, both internally and externally, throughout its length that (see FIG. 3) it is formed with an opposed pair of walls including flat and parallel portions 11 which are of equal widths $w$ and are flanked by an opposed pair of narrower walls 12 which are semi-circular in cross-section and of which the concave surfaces are disposed internally of the tube, are tangential to the internal surfaces of the flat wall portions 11, and are of equal radii R, and all the said walls are of the same uniform thickness T.

The wall thickness T is ascertained mathematically and is such that, when the element 6 is manufactured from the tube, is installed in the hot and cold water mixing valve, and is heated to a maximum predetermined temperature, namely the temperature of the hot water, the resuulting increase in internal pressure due to the expansion of the liquid contents of the tube, does not deflect the tube beyond the elastic limit of the metal from which it is fabricated and any change in the cross-sectional configuration of the tube is confined within acceptable limits so that, as and when the temperature of the element is reduced to a predetermined minimum, namely the temperature of the cold water, the tube returns to its initial spiral formation and cross-sectional configuration.

The internal radius R of the narrower walls 12 is never less than twice, and never more than five times, the wall thickness T; the mean thickness D of the tube is equal to the sum of twice the internal radius of the narrower walls and the wall thickness and, therefore, is between five times and eleven times the wall thickness; the width $w$ of the flat and parallel wall portions 11 is not less than the said mean thickness; and the mean width W of the tube is equal to the sum of the width of the said wall portions, twice the internal radius of the narrower walls and the wall thickness so that it is not less than twice the mean thickness D.

For example, the wall thickness T may be 0.012 inch, the internal radius R of the narrow walls 12 may be 0.024 inch so that the means thickness D of the tube is 0.060 inch, and the width $w$ of the wall portions 11 may be 0.24 inch so that the mean width W of the tube is 0.30 inch.

Before the element 6 is manufactured from the open-ended tube, the latter is cut, if necessary, to a length which is such that, when the manufactured element is assembled in the mixing valve and is subjected to a change of temperature equal to two thirds of the difference between the temperatures of the hot and cold water, it exerts upon the ported sleeve 5 a torque sufficient to overcome frictional and other forces resisting rotation of the sleeve about the pillar 3, and is deflected to an extent capable of rotating the sleeve around the pillar from one to the other of two extreme positions in one of which the flow of hot water, and in the other of which the flow of cold water, to the interior of the cover 4 is cut off. The torque which must be developed by the element to overcome the forces resisting rotation of the sleeve, is ascertained experimentally and known mechanical means are provided for preventing rotation of the sleeve beyond either of the said extreme positions. When an open-ended tube having the cross-sectional shape and dimensions exemplified above is being converted, as hereinafter described, into the thermally sensitive element, and each of the two superimposed coils is given an initial spiral pitch equal to the overall thickness of the tube in the unfilled and unstressed condition, and the innermost convolutions of the coils have a bend radius of 0.375 inch, the length of tube each coil may be 15.00 inches.

The open-ended tube is fabricated from a non-corrodible metal, preferably either a beryllium-copper alloy having a composition in the order of 1.50 to 2.70% beryllium and 0.05 to 0.40% cobalt or nickel, the remainder being copper, or a Phosphor bronze having a composition in the order of 1.00 to 10.00% tin, 0.05 to 0.50% phosphorus, up to 4.00% lead and up to 3.00% zinc, the remainder being copper.

To produce the thermally sensitive unit from an open-ended tube composed of either of the above alloys, the tube is, if necessary, cut to the required length and subjected to an annealing heat treatment. Subsequently, the tube is filled with paraffin wax or any other non-toxic supporting medium having a low melting point comparable to the melting point of paraffin wax, whereupon it is stepped midway between its ends so that the step is flanked by two similar, offset, straight and parallel portions of which the upper and lower edges consist of the curved, narrower walls of the tube and each of which is then formed into a closely wound, constant pitch spiral coil having a free end of the tube in the innermost convolution. The two coils are arranged in superimposed, concentric relationship and when once they are formed the supporting medium is melted, is expelled from the tube by, for example, compressed air and the coils are subjected to a stress relieving or precipitation hardening, heating and quenching treatment; after this treatment, the free end of one of the two coils is closed and sealed, the tube is evacuated and distilled water is pumped or otherwise forced into the tube through a valve assembled to the free end of the second coil, until the tube is filled completely with the water at a pressure which is ascertained experimentally and may, for example when the cross sectional configuration and dimensions of the tube are as exemplified above, be in the order of 95 to 150 pounds per square inch, so that the coils are pre-stressed and deflected in the direction which causes them to unwind partially. Finally, the free end of the second coil is sealed so that the pressure of the distilled water and the pre-stressing of the tube are maintained, and the valve is removed.

The element is assembled in the hot and cold water mixing valve by anchoring the innermost convolutions of the two superimposed and prestressed spiral coils, to the spindle 8 and hub 9, respectively. Consequently, the element is housed within the cover 4 and, when the valve is in operation, is submerged in, and is at the same temperature as, the mixture of hot and cold water produced in the cover under the control of the ported sleeve. Hence, any variation in the temperature of the mixture from a value preselected by manual adjustment of the knob 7, results in a corresponding variation in the temperature of the element. As the temperature increases, the distilled water confined within the sealed tube, expands thereby increasing the internal pressure developed within, and the stress and deflection of, the element, the said internal pressure being at a maximum when the preselected temperature of the mixture is at a maximum. Further, the torque exerted on the ported sleeve by the element due to any variation in its internal pressure, imparts an angular movement to the ported sleeve; to enable the same angular movement to be imparted to the sleeve for each unit of pressure variation, the distilled water is confined within the element, as initially produced, at a pressure equal to one-third of a permissible maximum which may be developed within the tube, is ascertained mathematically and, when the cross-sectional configuration and dimensions of the tube and the initial pressure of the distilled water are as exemplified above, is in the order of 285 to 360 pounds per square inch. Since, first, the variation in the pressure of the distilled water is proportional to any variation in the temperature of the mixture; secondly, under normal operating conditions, the cold water is supplied to the valve at a temperature in the region of 50° F. whereas the hot water is supplied at a temperature in the region of 200° F.; and thirdly, the mixture temperature may be preselected to any value between these two extremes of temperature, any departure of the mixture temperature from the preselected value results in an appreciable change in the pressure of the distilled water so that the sensitivity of the response of the valve to any such departure, is enhanced.

Although the invention has been described with reference to a valve wherein the relative proportions of the constituents of a mixture of hot and cold water are controlled by a ported rotatable sleeve actuated by a twin-coil, thermally sensitive element, it is to be understood that the element may comprise a single coil, and/or may be installed in a valve wherein the relative proportions of the constituents of a mixture of any two fluids at different temperatures are controlled by a reciprocable, instead of a rotatable, member, adapted to be actuated by the element.

I claim:

1. A thermally sensitive element comprising a resilient, sealed and spiral metal tube having a uniform mean thickness, a wall of uniform thickness and a cross section which is of uniform dimensions and is formed by two opposed convexly curved and two opposed flat and parallel wall portions, the radii of the internal surfaces of the convexly curved wall portions being equal to one another and not less than twice but not more than five times the said wall thickness, the widths of the parallel wall portions being equal to one another and not less than the mean thickness of the tube, the mean width of the tube being not less than twice the said mean thickness and being filled with liquid at a pressure in the order of 285 to 360 pounds per square inch so as to prestress the tube and enhance the thermal sensitivity of the element.

References Cited

UNITED STATES PATENTS

| | | | |
|---|---|---|---|
| 12,880 | 8/1900 | Clamer et al. | 75—156 |
| 398,526 | 2/1889 | McCloskey | 73—368.6 X |
| 1,521,343 | 12/1924 | Townsend | 73—368.6 X |
| 2,205,334 | 6/1940 | Barnes | 236—99 X |
| 2,206,905 | 7/1940 | Leonard et al. | 236—99 |
| 3,007,644 | 11/1961 | Drummond | 236—12 |
| 3,343,250 | 9/1967 | Berto et al. | 29—423 |
| 2,319,539 | 5/1943 | Dodd | 75—156.5 |

OTHER REFERENCES

Publication: "Materials & Methods Manual" (Brush Beryllium Co.), by J. T. Richards, pages 75–82 only, April 1950.

LOUIS R. PRINCE, Primary Examiner

D. M. YASICH, Assistant Examiner

U.S. Cl. X.R.

236—12 R